US011365823B2

(12) United States Patent
Heinrich et al.

(10) Patent No.: US 11,365,823 B2
(45) Date of Patent: Jun. 21, 2022

(54) VALVE WITH TEMPERATURE COMPENSATION

(71) Applicant: EAGLE ACTUATOR COMPONENTS GMBH & CO. KG, Weinheim (DE)

(72) Inventors: Ralf Heinrich, Schwegenheim (DE); Daniel Koch, Edingen-Neckarhausen (DE); Diether Hoppner, Mannheim (DE); Siegfried Driemer, Fürth (DE)

(73) Assignee: EAGLE ACTUATOR COMPONENTS GMBH & CO. KG, Weinheim (DE)

( * ) Notice: Subject to any disclaimer, the term of this patent is extended or adjusted under 35 U.S.C. 154(b) by 141 days.

(21) Appl. No.: 16/736,700

(22) Filed: Jan. 7, 2020

(65) Prior Publication Data

US 2020/0141512 A1 May 7, 2020

Related U.S. Application Data

(63) Continuation-in-part of application No. 15/651,971, filed on Jul. 17, 2017, now abandoned, which is a
(Continued)

(30) Foreign Application Priority Data

Apr. 24, 2014 (DE) .................. 10 2014 005 809.3
Jul. 19, 2016 (DE) .................. 10 2016 113 313.2

(51) Int. Cl.
*F16K 31/06* (2006.01)
*H01F 27/28* (2006.01)
(Continued)

(52) U.S. Cl.
CPC ..... *F16K 31/0675* (2013.01); *F02M 25/0836* (2013.01); *H01F 27/008* (2013.01);
(Continued)

(58) Field of Classification Search
CPC ............ F16K 31/0675; F02M 25/0836; H01F 27/008; H01F 7/1607
See application file for complete search history.

(56) References Cited

U.S. PATENT DOCUMENTS 2,026,616 A * 1/1936 Dike .................. H01C 7/06
338/264
2,140,553 A * 12/1938 Rypinski .................. H01F 7/08
335/218
(Continued)

FOREIGN PATENT DOCUMENTS

| CN | 105570517 A | 5/2016 |
|---|---|---|
| DE | 102014222504 A1 | 5/2016 |
| JP | 2010074013 A * | 4/2010 |

OTHER PUBLICATIONS

Translation of JP2010074013A. Apr. 2, 2010. (Year: 2010).*

*Primary Examiner* — Jared Fureman
*Assistant Examiner* — Christopher J Clark
(74) *Attorney, Agent, or Firm* — Katterle Nupp LLC; Paul Katterle; Robert Nupp

(57) ABSTRACT

A valve is provided having a circuit that includes an electrical conductor with a temperature-dependent electrical resistance. The electrical conductor is connected in series to an electrical series resistor, which includes a parallel circuit of a non-reactive wire and an NTC resistor. The electrical conductor includes a coil wire wound into a magnetic coil that is operable to move an armature to open or close the valve. The effect of the operation of the valve itself on the magnetic force of the coil is minimized by arranging the NTC resistor to be thermally coupled with the coil wire.

8 Claims, 9 Drawing Sheets

Related U.S. Application Data continuation-in-part of application No. 15/300,814, filed as application No. PCT/EP2015/000627 on Mar. 24, 2015, now abandoned.

(51) Int. Cl.
　　*H01F 27/00*　　(2006.01)
　　*F02M 25/08*　　(2006.01)
　　*H01F 27/40*　　(2006.01)

(52) U.S. Cl.
　　CPC . *H01F 27/2866* (2013.01); *F02M 2025/0845* (2013.01); *H01F 2027/406* (2013.01)

(56) References Cited

U.S. PATENT DOCUMENTS

| | | | |
|---|---|---|---|
| 3,979,823 A * | 9/1976 | Hayasaka | H01C 17/232 29/610.1 |
| 8,469,051 B2 | 6/2013 | Bittner | |
| 2005/0061302 A1 * | 3/2005 | Tatsu | F16K 31/082 123/520 |
| 2014/0096838 A1 * | 4/2014 | Burns | F16K 25/00 137/15.06 |
| 2019/0345898 A1 | 11/2019 | Schwinn | |

* cited by examiner

VALVE WITH TEMPERATURE COMPENSATION

CROSS-REFERENCE TO RELATED APPLICATIONS

This application is a continuation-in-part of U.S. patent application Ser. No. 15/300,814, filed on Sep. 30, 2016, and is a continuation-in-part of U.S. patent application Ser. No. 15/651,971, filed on Jul. 17, 2017; said U.S. patent application Ser. No. 15/300,814 being the U.S. national phase of PCT Application No. PCT/EP2015/000627 filed on Mar. 24, 2015, which claims priority to German Patent Application No. 10 2014 005 809.3 filed on Apr. 24, 2014; said U.S. patent application Ser. No. 15/651,971 claiming priority under 35 U.S.C. § 119 to German Patent Application No. 10 2016 113 313.2, filed on Jul. 19, 2016; and wherein the disclosures of all of the foregoing patent applications are herein incorporated by reference.

TECHNICAL FIELD

The invention relates to a valve for use in an environment that commonly experiences temperature variations.

BACKGROUND

It is known to use electrical circuits in valves for compensation of temperature influences. Such a circuit is disclosed in DE 196 46 986 A1.

The disclosed valves are preferably used in motor vehicles and are provided with electromagnetic coils, which may be operated in a timed way. Such coils actuate metallic armatures by means of magnetic forces. The metallic armatures close or open sealing seats, in order to allow or avoid a flow of material through a conduit.

The magnetic force of a coil is a function of the electric current. In case of voltage-controlled operation of the coil, the current depends on the electric resistance of its wound wire. With increasing temperature, the electric resistance rises, so that the current is reduced and the magnetic force of the coil is weakened.

Since these valves are often mounted in the engine compartments of motor vehicles, the valves are subject to widely varying temperatures as a result of changes in the ambient temperature and the engine operating conditions. This wide variation in temperature affects the electrical resistance of the valve coils.

In order to avoid this, DE 196 46 986 A1 proposes to operate a primary and a secondary coil. The secondary coil is series-connected with a temperature-dependent NTC resistor, whose electric resistance decreases with an increase in temperature. In this way, the voltage on the secondary coil is increased and its magnetic force is strengthened. The secondary coil may compensate, through its increasing magnetic force, the magnetic force of the primary coil, which falls with an increase in temperature. In this case, it is disadvantageous that the valve is provided with two coils, which have to be wound and adequately mounted. This causes a complex apparatus related construction.

FR 2 893 756 A1 discloses an assembly, in which a temperature-independent resistor is parallel-connected with an NTC resistor and both resistors form a series resistor. Both resistors are housed within a device, which is provided with a basis body of plastic material and a cover with contact flaps. A coil may be connected to this device, in order to be series-connected with the series resistor. The bulky temperature-independent resistor is inserted in a cavity of the basis body. This device occupies a relatively large space and is also constructively relatively complex. It's application in valves, especially in compact valves, is therefore limited.

The present disclosure therefore relates to a valve having a circuit that minimizes the influence of temperature on the resistance of its coil wire.

SUMMARY

The present disclosure is directed to a valve that includes a conduit through which fluid may flow, a sealing seat and a coil that includes an electric conductor wound over a coil support. An armature is at least partially disposed within the coil and is movable to open and close the sealing seat to control the flow of fluid through the conduit. The armature is movable in response to a magnetic field generated by the coil. An electric series resistor compensates for temperature-related resistance changes of the coil. The electric series resistor is connected in series with the coil and includes a non-reactive wire connected in parallel with a negative temperature coefficient resistor. The non-reactive wire is wound around the coil support so as to be coaxial with the coil. The resistance of the non-reactive wire at 600° C. is less than 20% higher than the resistance of the non-reactive wire at 20° C.

The foregoing valve may be used in a regeneration system that includes a fuel tank for storing fuel and an activated carbon container that captures fuel vapors from the fuel tank. An internal combustion engine receives the fuel vapors from the activated carbon container, together with intake air. The valve controls the flow of fuel vapors from the activated carbon container to the internal combustion engine.

DETAILED DESCRIPTION

Figure 1:
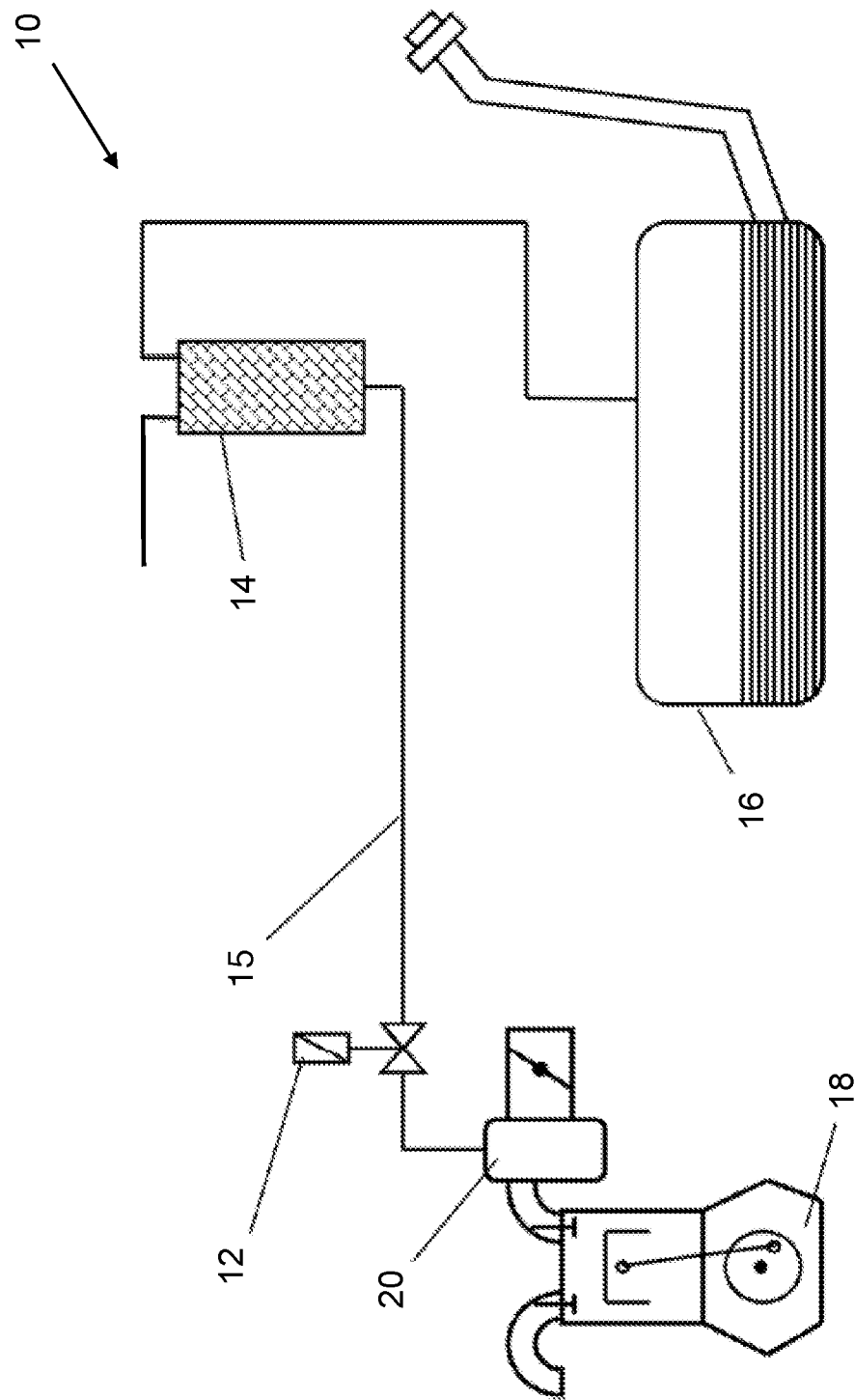
FIG. 1 shows a schematic of a regeneration system for an automobile.

According to the disclosure, a valve is provided having an electromagnetic coil that is connected in series with a series resistor having a non-reactive resistor that is exclusively or predominantly a non-reactive wire. The resistance of a non-reactive wire may be readily adjusted by changing its length. A non-reactive wire is also cheaper, lighter and forms a less bulky resistor. As such, a non-reactive wire may be integrated into a circuit without occupying much space. The electromagnetic coil comprises an electric conductor with a temperature-dependent electric resistance. The electric series resistor comprises a parallel circuit comprised of a non-reactive resistor and a negative temperature coefficient (NTC) resistor, which has a resistance that decreases with an increase in temperature. It has been found that by means of a parallel connection of a purely non-reactive resistor, which is formed by a non-reactive wire, and an NTC resistor, it is constructively easy to compensate a temperature-dependent change of resistance of the electric conductor of the electromagnetic coil. The increase of the electric resistance of the electric conductor is compensated by a reduction of the electric resistance of the series resistor. In this way it is possible that the total resistance formed by the electric conductor and the series resistor may be approximately kept at a constant level throughout a certain temperature range. In this way a temperature independent operating current is achieved in voltage-controlled components. In this sense a compact circuit is provided, with which the influence of temperature on an electric conductor may be minimized by using a simple design.

The non-reactive wire may have a specific electric resistance, whose value at 600° C. is less than 20%, preferably less than 10%, and in particular preferably less than 5% higher than its value at 20° C. In this way, the electric resistance of the non-reactive resistor is almost temperature independent.

The non-reactive wire may be manufactured using Constantan or may comprise Constantan. Constantan is an alloy whose specific electric resistance is eminently temperature independent. Constantan is also a trademark. It defines an alloy, which usually contains approximately 53-57% copper, approximately 43-45% nickel and approximately 0.5-1.2% manganese. This alloy is provided with an approximately constant specific electric resistance over wide temperature ranges.

The non-reactive wire may additionally be wound over the electromagnetic coil, which, as an electric conductor, has a temperature-dependent electric resistance. In this way the non-reactive wire may be positioned into the circuit without occupying much space. Moreover, the non-reactive wire contributes to the magnetic field of the coil and may strengthen it. The non-reactive wire may be wound under, over or beside a copper wire of the coil, if, on the coil, it is only electrically insulated from the latter.

In this context, the non-reactive wire may be additionally wound over a coil support, which exhibit, as an electric conductor, the temperature-dependent electric resistance, wherein the non-reactive wire is positioned in its own winding area. The non-reactive wire, preferably a Constantan wire, is not applied as an additional layer over copper wire windings, for example, but is provided with its own winding area on the coil support.

The electric conductor may be provided with a copper wire. Due to the series resistor, the temperature-related resistance change of copper may be compensated very well. This effect may be used with all electromotive actuators whose operation is voltage-controlled instead of current-controlled.

Therefore, it is possible that not only valves, but also other linear drives, motors and other actuators may be provided with the present circuit. In this context, the present circuit may therefore be used in an actuator, an electromotive drive or in a valve.

In addition to the circuit of above said kind, the valve may further comprise an armature, which, upon electrification of the electromagnetic coil, may be driven by the magnetic force of the coil. As set forth above, the coil is series-connected with the electric series resistor, which comprises a parallel circuit formed by the non-reactive resistor and the NTC resistor. Due to the parallel-connection of the purely non-reactive resistor and the NTC resistor, a compensation of a temperature-related resistance change of the coil may be obtained.

Advantageously, between 0 and 140° C. a resistance change of the coil may be very well compensated, wherein the temperature range may be modified by a suitable selection of components of the series resistor. The electric resistance of the coil increases in this temperature range almost linearly, whereas the total resistance of the series connection of the coil and the series resistor remains almost constant in this temperature range. The increase of the electric resistance of the coil is compensated by the reduction of electric resistance of the series resistor. In the end, the total resistance is approximately constant, so that the resulting coil current remains constant without any significant loss of magnetic force of coil. Due to the use of only two electric components for the series resistor, a valve is provided, in which the influence of temperature on the magnetic force of coil is as low as possible, wherein the valve is provided with as few as possible electric components.

Only one coil may be provided. In this way, a design with few components is ensured. Complex winding operations on various coils are avoided.

Referring now to FIG. 1, there is shown a regeneration system 10 having a valve 12 embodied in accordance with the present disclosure. The valve 12 is being used as a regeneration valve for dosing fuel vapors. More specifically, the valve 12 controls gasoline vapors coming from an active carbon container 14 through an intake line 15.

Hydrocarbons evaporate in a fuel tank 16 of a motor vehicle, which is driven by an internal combustion engine 18. In order to avoid a pressure increase in the fuel tank 16, it is necessary to vent excess air and fuel vapors. The fuel vapors may be stored in the active carbon container 14, where hydrocarbons are absorbed.

In order to clean the active carbon container 14, the hydrocarbons may be periodically redrawn from the active carbon container 14 by setting adequate pressure conditions, and then be fed to an intake tract 20 of the internal combustion engine 18, together with the intake air.

In order to dose the hydrocarbons in the intake air, the valve 12 of the present disclosure is used, since it operates in a relatively temperature-independent way and therefore in a very precise and reproducible way. The valve 12 may be mounted in an engine compartment that encloses the internal combustion engine 18. Inside the engine compartment, the temperature may vary widely, such as from under 20° C. to over 100° C., depending on the outside temperature and the operating conditions of the engine 18. As such, the valve 12 may be specially constructed to operate in a temperature range of from about 20° C. to about 140° C.

Figure 2:
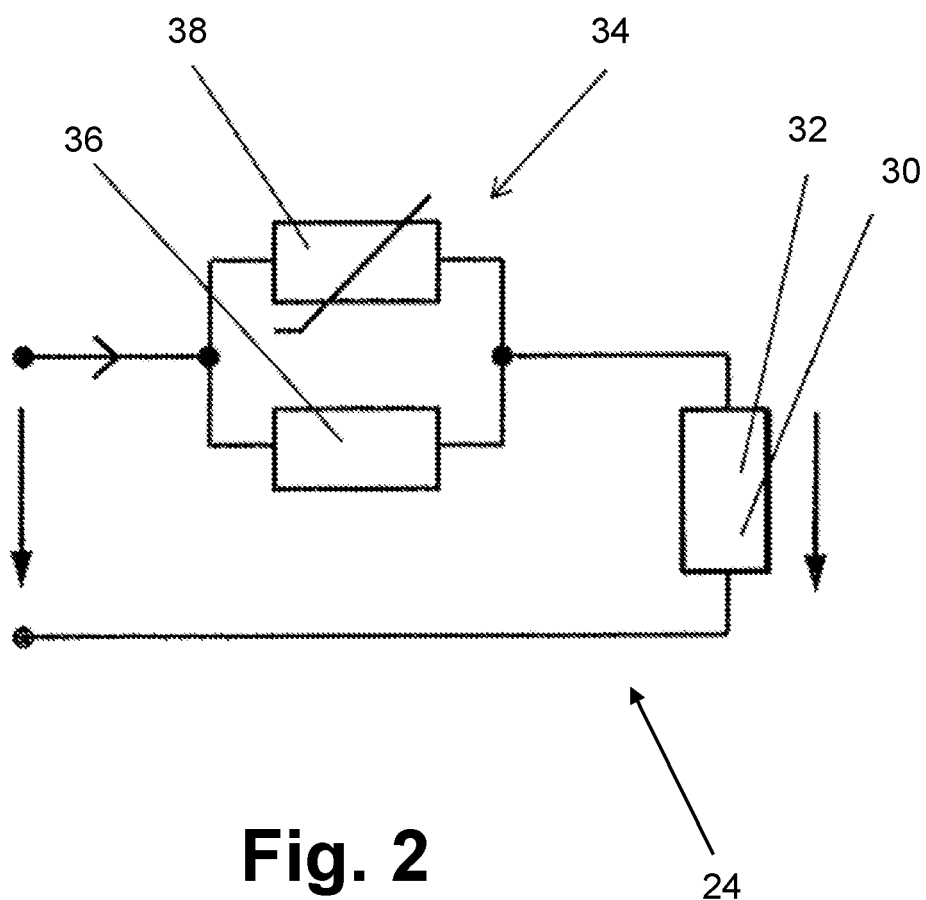
FIG. 2 shows a circuit, in which a coil is series-connected with a parallel circuit formed by a non-reactive resistor and an NTC resistor.

FIG. 2 shows an equivalent circuit 24 that may be used in the valve 12. The circuit 24 includes an electric conductor 30 having a temperature-dependent electric resistance 32, which is series-connected with an electric series resistor 34. The electric series resistor 34 comprises a parallel circuit formed by a non-reactive resistor 36 and an NTC resistor 38.

Figure 5:
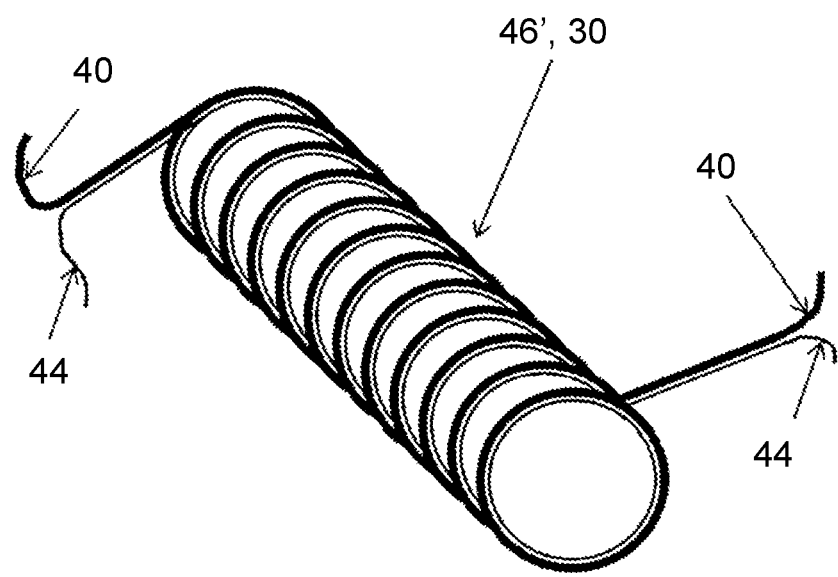
FIG. 5 is a schematic illustration of a coil, on which, in addition to a copper wire, a wire of Constantan is wound, wherein the copper wire and the Constantan wire on the coil are electrically insulated from each other.
Figure 6:
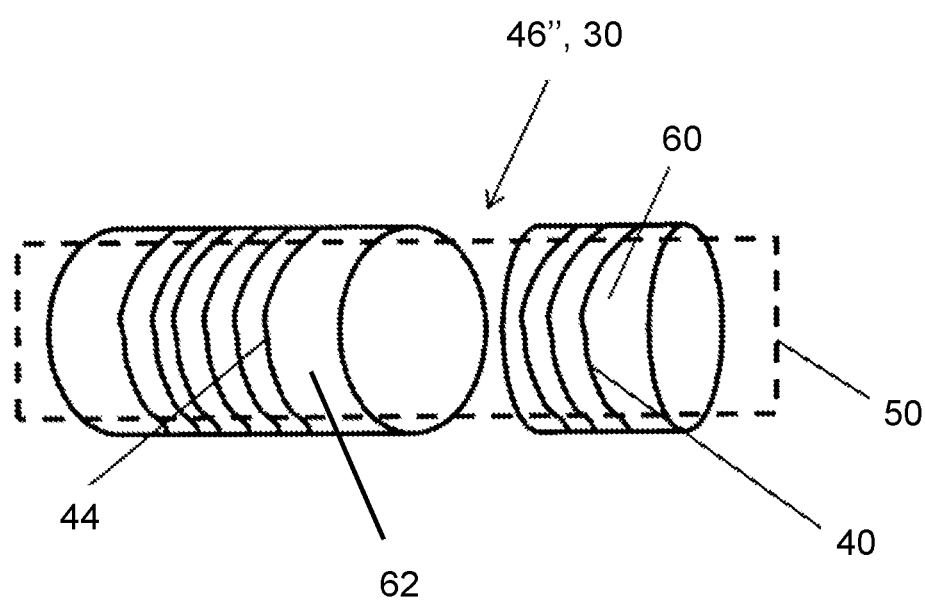
FIG. 6 shows a schematic illustration of a coil, on which, in addition to a copper wire, a wire of Constantan is wound, wherein the copper wire and the Constantan wire are positioned in different winding areas.

The non-reactive resistor 36 is exclusively or predominantly formed by a non-reactive wire 40, which is shown in FIGS. 5 and 6.

The electric conductor 30 includes a conductor wire 44, which may be formed from copper or an alloy thereof. The conductor wire 44 is wound and forms part of an electromagnetic coil 46. The conductor wire 44 may be wound over a coil support 50, which also forms part of the electromagnetic coil 46.

The valve 12 further includes an armature 52, which may be driven by the magnetic force of the coil 46. The coil 46 is series-connected with the electric series resistor 34. As described above, the electric series resistor 34 is formed by a parallel circuit formed by the non-reactive resistor 36, i.e. a passive electric resistor, and the NTC resistor 38.

The passive, non-reactive resistor 36 is exclusively or predominantly formed by the non-reactive wire 40, which is shown in FIGS. 5 and 6. The non-reactive wire 40 exhibits a specific electric resistance, whose value at 600° C. is less than 5% above its value at 20° C. The non-reactive wire 40 is made of Constantan (trade mark). As shown in FIGS. 5 and 6, the non-reactive wire 40 is wound and arranged so as to be coaxial with the coil 46.

Concretely, the series resistor 34 is formed by the parallel circuit formed by the non-reactive resistor 36 and the NTC resistor 38. The electric resistance of the NTC resistor 38 decreases with an increase in temperature.

Only one coil 46 is shown as being provided. However, a larger number of series-connected coils may also be provided. The single coil 46 is series-connected with the series resistor 34. In the equivalent circuit 24, coil 46 is represented by its electric resistance 32, i.e. the electric resistance 32 of the electric conductor 30.

Figure 3:
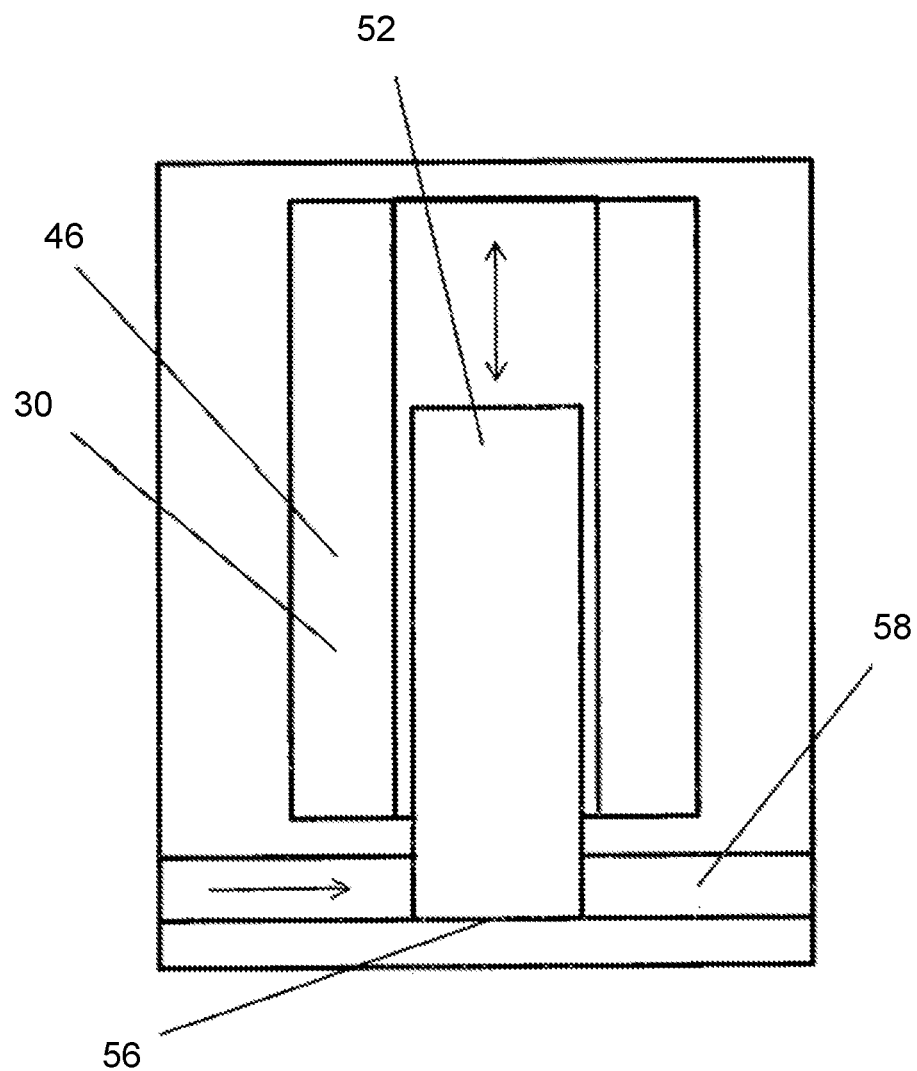
FIG. 3 is a schematic representation of a valve, in which the circuit of FIG. 2 is provided.

FIG. 3 schematically shows that the armature 52 closes or opens a sealing seat 56, in order to allow or inhibit a flow of material through the conduit 58. The armature 52 may perform an up-and-down motion. This is shown by the double arrow. Usually, the armature 52 is pressed by a spring against the sealing seat 56. Through the magnetic force of the electrified coil 46, the armature 52 is raised against the force of the spring from the sealing seat 56. Once no current flows through the coil 46, the armature 52 is again pressed by the spring on the sealing seat 56. This procedure may be reversed, and in this case the valve would be a closing instead of an opening device.

Figure 4:
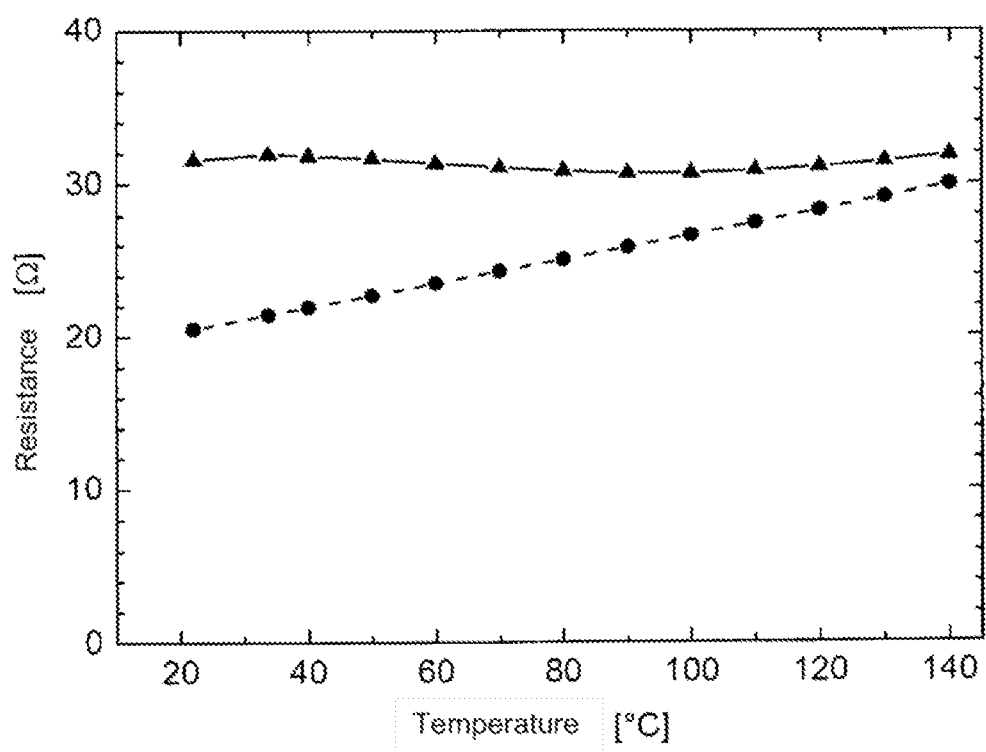
FIG. 4 is a diagram, in which the temperature dependence of the electric resistor of the coil and of the total resistance formed by coil and parallel circuit is shown.

FIG. 4 shows a diagram, in which the temperature dependence of the electric resistance 32 of the coil 46 as an electric conductor 30 is represented by circular symbols. When temperature increases so does the uncompensated electric resistance 32 of the coil 46 or electric conductor 30.

In this example, the electric resistance 32 increases by about 50% of its original value in case of a temperature increase from 20° C. to 140° C. The electric resistance 32 of the coil 46 increases from about 20 to about 30 ohm.

The temperature compensated electric total resistance, which is formed by the sum of the electric resistance of the coil 46 and the series resistor 34 of the parallel circuit formed by the non-reactive resistor 36 and the NTC resistor 38, is approximately constant in the above said temperature range. The temperature compensated total resistance fluctuates only by about a few percentages, preferably a maximum of 2%, about an average value. The average value in this case is about 30 ohm. This is shown by triangular symbols. This value very strongly depends on the temperature range, for which the series resistor 34 is designed.

The series resistance $R_V$ of the parallel circuit is calculated according to following formula, wherein $R_\Omega$ represents the purely non-reactive resistor 36 and $R_{NTC}$ represents the NTC resistor 38.

$$R_V = \frac{1}{\frac{1}{R_\Omega} + \frac{1}{R_{NTC}}}$$

The temperature-compensated total resistance $R_{total}$ formed by the parallel circuit and the coil 46 is calculated by the following formula, wherein $R_{coil}$ represents the electric resistance 32 of the coil 46 or the electric conductor 30.

$$R_{total} = R_V + R_{coil}$$

FIG. 5 shows a schematic illustration of an embodiment of the electromagnetic coil, designated with the reference numeral 46', which may be used in the valve 12. In the coil 46', the conductor wire 44 and the non-reactive wire 40 are wound together. The non-reactive wire 40 has a specific electric resistance, whose value at 600° C. is less than 5% higher than its value at 20° C. The non-reactive wire 40 is made of Constantan. The non-reactive wire 40 is wound over the conductor wire 44 in the coil 46', i.e., is wound over the coil 46'. Since the coil 46' comprises the electric conductor 30, the coil 46' has the temperature-dependent electric resistance 32.

FIG. 6 shows a schematic illustration of another embodiment of the electromagnetic coil, designated with the reference numeral 46", which may be used in the valve 12. In FIG. 6, the conductor wire 44 of the coil 46" and the non-reactive wire 40 are shown wound over the coil support 50. Once again, the non-reactive wire 40 has a specific electric resistance, whose value at 600° C. is less than 5% higher than its value at 20° C. The non-reactive wire 40 is made of Constantan. The non-reactive wire 40 is wound in its own winding area 60 of the coil support 50, which is separate from a winding area 62 of the coil support 50, upon which the conductor wire 44 is wound to form the coil 46". Since the coil 46" comprises the electric conductor 30, the coil 46" has the temperature-dependent electric resistance 32.

It has been determined that the current that is conducted through the coil 46 rapidly heats the conductor wire 44, which, in turn, rapidly increases the electrical resistance thereof. The NTC resistor 38 is therefore arranged so as to be thermally coupled with the conductor wire 44. The immediate proximity of the NTC resistor 38 to the warm conductor wire 44 can be exploited in order to influence the resistance of the NTC resistor 38 very quickly in a suitable manner. The NTC resistor 38 then compensates nearly without a time-delay for the change in resistance associated with the heating of the conductor wire 44.

Surprisingly, it has been found that the heat of the engine 18 has less influence on the resistance of the NTC resistor 38 than even the occasional operation of the coil 46, particularly a clocked operation or use of the coil 46 only in defined intervals. It has thus been recognized that sometimes it is more important to compensate for the temperature of the conductor wire 44 rather than for the ambient temperature of the valve 12.

In some embodiments, the NTC resistor 38 may be spaced apart from the conductor wire 44 by less than the diameter of the conductor wire 44. More specifically, the NTC resistor 38 may be spaced apart 0.5 to 1 mm from the conductor wire 44. This distance from the conductor wire 44 has proven to be especially suitable in order to establish thermal coupling. Preferably, the NTC resistor 38 is spaced apart radially and/or axially from a winding of the conductor wire 44 in the abovementioned spacing interval.

The NTC resistor 38 can be integrated into a plastic outer casing 68 of the valve 12. The plastic has the effect of providing good heat conduction and correct spacing of the NTC resistor 38 relative to the coil 46 and its conductor wire 44.

Figure 7:
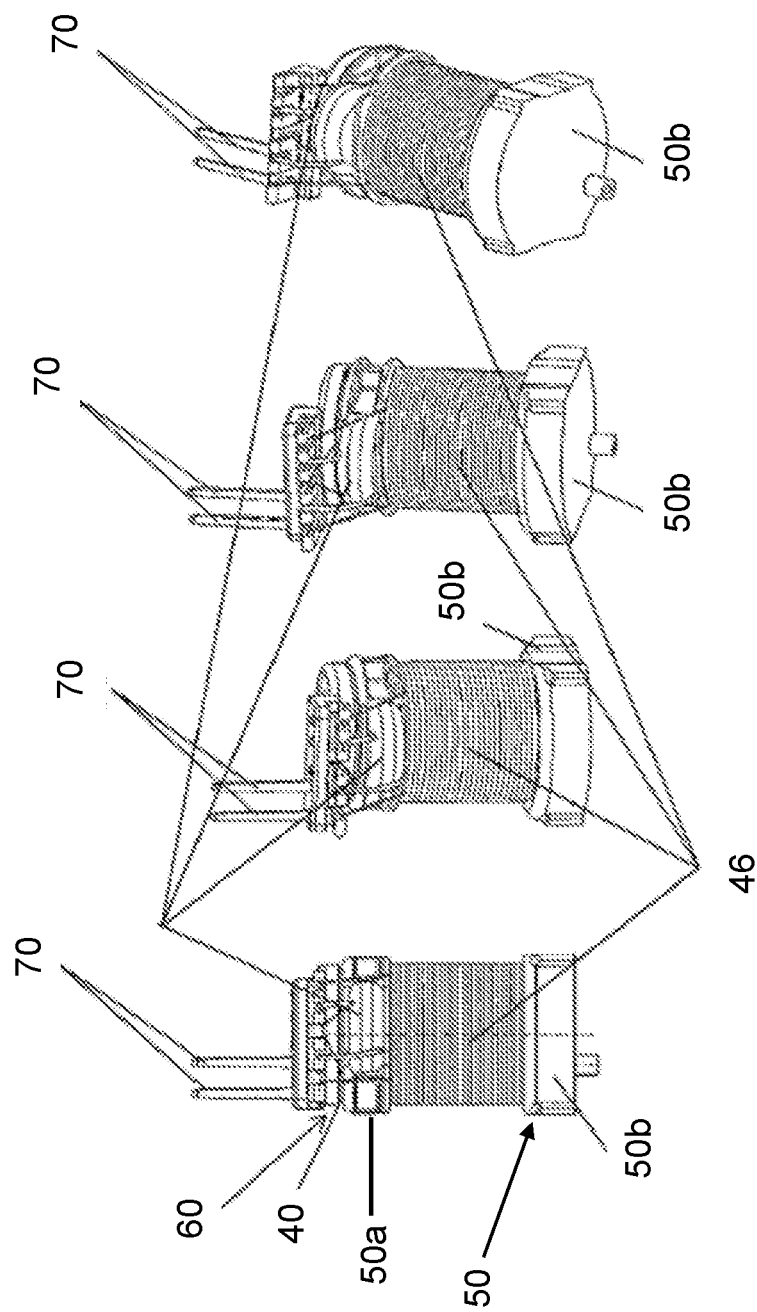
FIG. 7 shows four perspective views of a magnetic circuit of a valve, wherein the magnetic circuit includes an NTC resistor and a coil formed by a conductor wire.

Referring now to FIG. 7, there are shown four perspective views of the valve 12 without its outer casing 68. As shown, the conductor wire 44 is wound around the coil support 50 to form the coil 46. The wound conductor wire 44 (coil 46) is disposed between first and second end portions 50a, b of the coil support 50, which extend radially outward farther than the rest of the coil support 50. The NTC resistor 38 is disposed radially outward from the first end portion 50a of the coil support 50. The non-reactive wire 40 is disposed in the winding area 60, which is located in the first end portion 50a of the coil support 50, and is separate from the winding area 62 upon which the conductor wire 44 is wound. In this manner, the non-reactive wire 40 is located between the wound conductor wire 44 (coil 46) and connector pins 70, which connect the coil 46 to a source of DC power.

Figure 8:
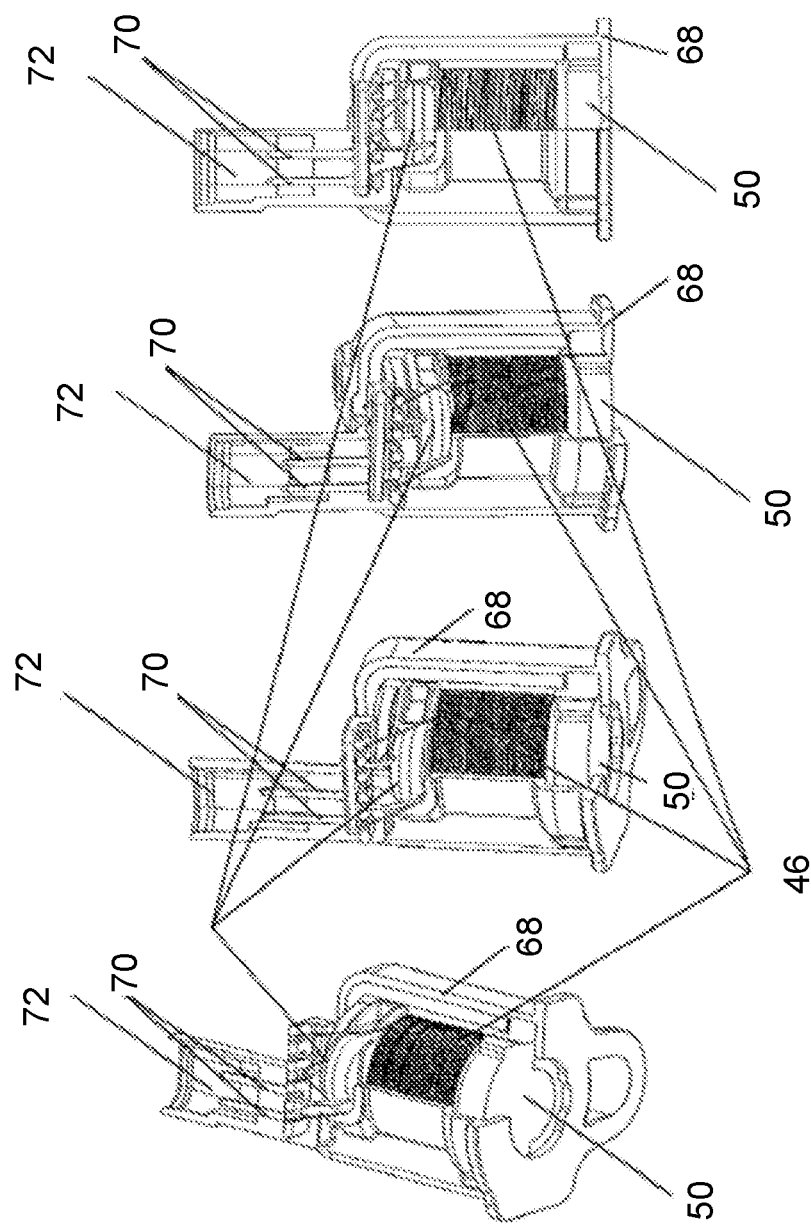
FIG. 8 shows four perspective views of the valve shown in FIG. 7, wherein portions of an outer casing of the valve are cut away to show the magnetic circuit.

Referring now to FIG. 8, there are shown four perspective views of the valve 12 with portions of the outer casing 68 cut away. As shown, the outer casing 68 encloses the coil 46 (including the coil support 50), the NTC resistor 38, the non-reactive wire 40 and the connector pins 70. The outer casing 68 forms a protective channel 72 for the connector pins 70. Free end portions of the connector pins 70 are disposed in an interior void of the channel 72. In this manner, the channel 72 and the connector pins 70 form a plug that may receive a mating plug to electrically connect the coil 46 to the source of DC power.

Figure 9:
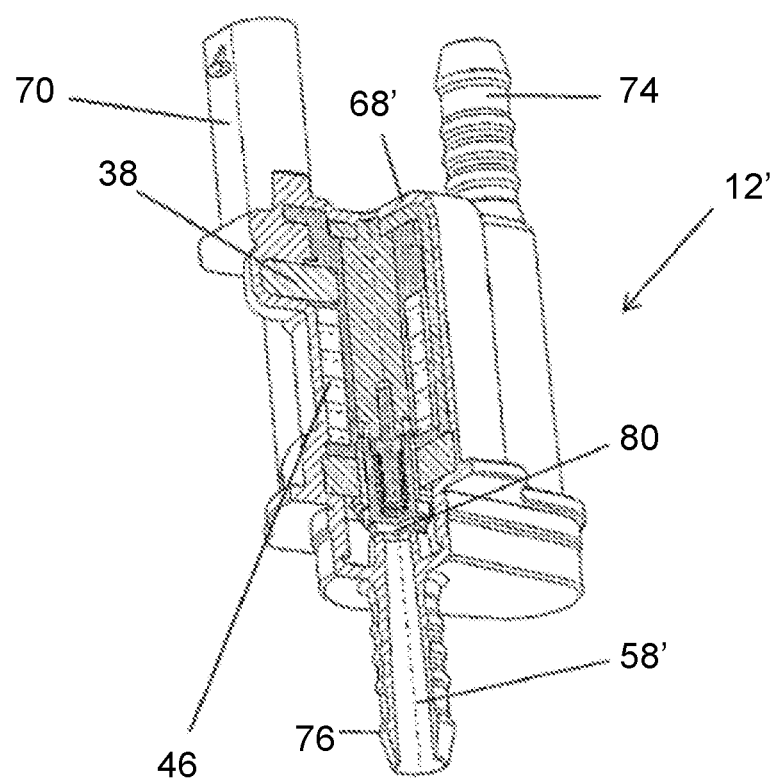
FIG. 9 shows a partially cut-away perspective view of a valve with temperature compensation.

Referring now to FIG. 9, there is shown a partially cut-away perspective view of another embodiment of the valve, designated with the reference numeral 12', which has substantially the same construction as the valve 12 and specifically includes the circuit 24 with the conductor 30 connected in series with the electric series resistor 34. The NTC resistor 38 is arranged so as to be thermally coupled with the wound conductor wire 44. The NTC resistor 38 is spaced apart 0.5 to 1 mm from the wound conductor wire 44. Specifically, the NTC resistor 38 is spaced apart axially from the coil 46, which is formed by the conductor wire 44. The NTC resistor 38 is integrated into a plastic outer casing 68' of the valve 12'. The NTC resistor 38 is arranged on the side of the coil 46 formed by the conductor wire 44 on which the external electrical connection occurs via the two connector pins 70. The valve 12' further comprises two connectors 74, 76 protruding in opposite directions that are parts of a conduit 58' that can be blocked by an armature 80.

The valve 12' may be used as a regeneration valve in the regeneration system 10 to dose fuel vapors.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A valve, comprising:
   a conduit through which fluid may flow;
   a sealing seat;
   a coil that includes an electric conductor wound over a coil support;
   an armature at least partially disposed within the coil and movable to open and close the sealing seat to control the flow of fluid through the conduit, the armature being movable in response to a magnetic field generated by the coil; and
   an electric series resistor that compensates for temperature-related resistance changes of the coil, the electric series resistor being connected in series with the coil and comprising a non-reactive wire connected in parallel with a negative temperature coefficient resistor, the non-reactive wire being wound around the coil support so as to be coaxial with the coil, and wherein the resistance of the non-reactive wire at 600° C. is less than 20% higher than the resistance of the non-reactive wire at 20° C.; and
   wherein the non-reactive wire is made of an alloy comprising copper, nickel and manganese, wherein the electric conductor of the coil comprises a copper wire and wherein the non-reactive wire is wound over the copper wire and is electrically insulated from the copper wire.

2. The valve of claim 1, wherein the non-reactive wire contributes to the magnetic field of the coil.

3. The valve of claim 1, wherein the resistance of the wire at 600° C. is less than 10% higher than the resistance of the wire at 20° C.

4. The regeneration system of claim 3, wherein the resistance of the wire at 600° C. is less than 5% higher than the resistance of the wire at 20° C.

5. The valve of claim 4, wherein the alloy comprises about 53-57% copper, about 43-45% nickel and about 0.5-1.2% manganese.

6. The valve of claim 1, wherein the coil and the electric series resistor form a circuit in which current through the circuit has an average value in a temperature range from 20 to 140° C., and wherein the current through the circuit at any temperature within the temperature range does not fluctuate from the average value by more than 2%.

7. A regeneration system comprising the valve of claim 1, the regeneration system further comprising:
   a fuel tank for storing fuel;
   an activated carbon container that captures fuel vapors from the fuel tank; and
   an internal combustion engine that receives the fuel vapors from the activated carbon container, together with intake air; and
   wherein the valve controls the flow of fuel vapors from the activated carbon container to the internal combustion engine.

8. The regeneration system of claim 7, wherein the resistance of the wire at 600° C. is less than 5% higher than the resistance of the wire at 20° C.

* * * * *